(12) United States Patent
Johnston

(10) Patent No.: US 11,833,879 B1
(45) Date of Patent: Dec. 5, 2023

(54) VEHICLE SUSPENSION BUSHING ASSEMBLY WITH TWO-PIECE BAR PIN AND METHOD OF ASSEMBLING THE SAME

(71) Applicant: The Pullman Company, Milan, OH (US)

(72) Inventor: Brent D. Johnston, Milan, OH (US)

(73) Assignee: The Pullman Company, Milan, OH (US)

( * ) Notice: Subject to any disclaimer, the term of this patent is extended or adjusted under 35 U.S.C. 154(b) by 0 days.

(21) Appl. No.: 17/746,057

(22) Filed: May 17, 2022

(51) Int. Cl.
    *B60G 7/02*      (2006.01)
    *F16C 11/04*      (2006.01)

(52) U.S. Cl.
    CPC .............. *B60G 7/02* (2013.01); *F16C 11/04* (2013.01); *B60G 2204/143* (2013.01); *B60G 2204/41* (2013.01); *F16C 2326/05* (2013.01)

(58) Field of Classification Search
    CPC .............. B60G 7/02; B60G 2204/143; B60G 2204/41; F16C 11/0609; F16C 11/0623; F16C 11/0661; F16C 11/08; Y10T 403/455; F16F 1/387; F16F 2236/08
See application file for complete search history.

(56) References Cited

U.S. PATENT DOCUMENTS

| | | |
|---|---|---|
| 84,772 A | 12/1868 | Shannon et al. |
| 1,384,186 A | 7/1921 | Fullington et al. |
| 2,240,894 A | 5/1941 | Roberts et al. |
| 2,292,128 A | 8/1942 | King et al. |
| 3,703,741 A | 11/1972 | Foster et al. |
| RE31,298 E | 7/1983 | Herbenar |
| 4,640,642 A | 2/1987 | Magid et al. |
| 4,648,738 A | 3/1987 | Thielen |
| 4,847,950 A | 7/1989 | Coleman |
| 6,435,757 B1* | 8/2002 | Casella .................... B60G 7/02 403/225 |
| 6,915,717 B2 | 7/2005 | Burgstaler et al. |
| 7,108,444 B2* | 9/2006 | Burgstaler ............... G05G 1/30 403/150 |
| 9,657,504 B2 | 5/2017 | Ramsauer |

(Continued)

FOREIGN PATENT DOCUMENTS

| | | |
|---|---|---|
| CN | 112549068 A | 3/2021 |
| FR | 2468026 A1 | 4/1981 |

*Primary Examiner* — James A English
*Assistant Examiner* — Matthew James O'Neill
(74) *Attorney, Agent, or Firm* — Harness, Dickey & Pierce, P.L.C.

(57) ABSTRACT

A bushing assembly, such as for a vehicle suspension, includes inner and outer sleeves, a bushing disposed radially between the inner and outer sleeves, and a two-piece bar pin. The two-piece bar pin is configured such that a first inboard end of a first bar pin component is received in one end of the inner sleeve and a second inboard end of a second bar pin component is received in the other end of the inner sleeve. One or both of the first and second inboard ends of the first and second bar pin components has a closed end bore such that the first and second bar pin components cooperate to form a closed cavity within the two-piece bar pin assembly for weight saving purposes when the first and second inboard ends of the first and second bar pin components are pressed into the inner sleeve.

19 Claims, 4 Drawing Sheets

(56) References Cited

U.S. PATENT DOCUMENTS

| | | | | |
|---|---|---|---|---|
| 2003/0201589 A1* | 10/2003 | Adema | ................... | B60G 7/02 |
| | | | | 267/36.1 |
| 2005/0005667 A1* | 1/2005 | Greczanik | ............... | B60D 1/06 |
| | | | | 72/370.03 |
| 2019/0040900 A1* | 2/2019 | Diehl | ................... | F16B 37/065 |

* cited by examiner

US 11,833,879 B1

VEHICLE SUSPENSION BUSHING ASSEMBLY WITH TWO-PIECE BAR PIN AND METHOD OF ASSEMBLING THE SAME

FIELD

The subject disclosure relates to vehicle suspension bushing assemblies and to methods of assembling vehicle suspension bushing assemblies.

BACKGROUND

This section provides background information related to the present disclosure which is not necessarily prior art.

Automobiles, trucks, buses and other vehicles are commonly designed with suspension systems that are connected by bushings to the vehicle chassis. For example, heavy vehicles such as semi-trucks that are equipped with solid axles commonly use leaf spring suspension systems where one end of the leaf springs are attached to a frame-mounted bracket by a heavy-duty bushing assembly. Such bushing assemblies decouple torsional input from other articulation directions. Each bushing assembly typically consists of an outer metal sleeve that is pressed into one end of the leaf spring, an elastomeric bushing positioned within the outer metal sleeve, an inner metal sleeve that extends through the center of the elastomeric bushing, and a one-piece bar pin that extends through the inner metal sleeve. Each end of the bar pin includes a hole that receives a bolt to bolt each end of the bar pin to the frame-mounted bracket.

The elastomeric bushing operates to isolate the vehicle from shock. The elastomeric bushing, which is located between the outer and inner metal sleeves, effectively isolates the vehicle frame from the unsprung components of the vehicle, such as the axle and wheel assemblies, and permits limited degrees of axial (longitudinal), radial (transverse), and pivotal (gimbaling) motion between the inner metal sleeve relative to the outer metal sleeve. In certain high load applications, the ends of the outer metal sleeve are curved or bent at least partially over the ends of the elastomeric bushing in order to further encapsulate the elastomeric bushing, which can improve the radial spring rate, the axial spring rate, the axial retention, and the durability of the elastomeric bushing.

While these elastomer isolated bushing assemblies have performed satisfactorily in the field, they are not light weight. Thus, there remains a need for the development of new bushing assemblies that are optimized for weight savings without compromising their noise, vibration, and harshness (NVH) performance, strength, and durability and without increasing manufacturing costs.

SUMMARY

This section provides a general summary of the disclosure and is not a comprehensive disclosure of its full scope or all of its features.

The subject disclosure relates to an improved bushing assembly of the type that may be used in a vehicle suspension system, for example. The improved bushing assembly includes an inner sleeve, an outer sleeve, a bushing disposed radially between the inner and outer sleeves, and a two-piece bar pin assembly that extends through the inner sleeve. The inner sleeve extends longitudinally between a first inner sleeve end and a second inner sleeve end. The inner sleeve extends annularly about a longitudinal axis, while the outer sleeve extends annularly about the inner sleeve in a radially spaced relationship. The two-piece bar pin assembly includes a first bar pin component and a second bar pin component. The first bar pin component extends longitudinally between a first inboard end and a first outboard end. The second bar pin component extends longitudinally between a second inboard end and a second outboard end. The two-piece bar pin assembly is arranged/assembled such that the first and second inboard ends of the first and second bar pin components are received in the inner sleeve in a press fit with the first and second inboard ends of the first and second bar pin components abutting one another.

In accordance with another aspect of the present disclosure, a bushing assembly is provided which includes an inner sleeve, an outer sleeve, a bushing disposed radially between the inner and outer sleeves, and a two-piece bar pin assembly that extends through the inner sleeve. The inner sleeve extends longitudinally between a first inner sleeve end and a second inner sleeve end. The inner sleeve extends annularly about a longitudinal axis, while the outer sleeve extends annularly about the inner sleeve in a radially spaced relationship. The two-piece bar pin assembly includes a first bar pin component and a second bar pin component. The first bar pin component extends longitudinally between a first inboard end and a first outboard end. The second bar pin component extends longitudinally between a second inboard end and a second outboard end. The two-piece bar pin assembly is arranged/assembled such that the first and second inboard ends of the first and second bar pin components are received in the inner sleeve. In addition, at least one of the first and second inboard ends of the first and second bar pin components has a closed end bore such that the first and second bar pin components cooperate to form a closed cavity within the two-piece bar pin assembly for weight saving purposes.

The design of the two-piece bar pin described herein is particularly advantageous because it provides weight savings with improved manufacturability and reduced scarp material losses that can reduce manufacturing costs. At the same time noise, vibration, and harshness (NVH) performance, strength, and durability of the bushing assembly can be maintained or improved.

In accordance with another aspect of the present disclosure, a method of assembling the bushing assemblies described above is also disclosed. The method includes the steps of: forming an inner sleeve with first and second inner sleeve ends, arranging an outer sleeve annularly about the inner sleeve such that the outer sleeve and the inner sleeve are radially spaced from one another and are concentrically aligned about a longitudinal axis, and molding a bushing of elastomeric material between the outer sleeve and the inner sleeve. The method further comprises the step of forming a two-piece bar pin by individually forming first and second bar pin components, where the first bar pin component is formed to include a first inboard end and a first outboard end and the second bar pin component is formed to include a second inboard end and a second outboard end. The method proceeds with the step of pressing the first inboard end of the first bar pin component into the first inner sleeve end and pressing the second inboard end of the second bar pin component into the second inner sleeve end until the first and second inboard ends of the first and second bar pin components abut one another inside the inner sleeve.

Advantageously, the process allows the two-piece bar pin assembly to be formed by cold forming, such as by a cold heading process, or a hot forming process, such as a hot forging process, both of which allow for the addition of weight reducing features without the generation of scrap material like that which would be produced by a machining operation. In addition, cold forming creates compacted areas of greater density in the first and second bar pin components, which increases the strength of the first and second bar pin components. Alternatively, one or more machining processes can be used to manufacture the two-piece bar pin assembly. When machining is used, the weight savings advantage is still achieved, even if scrap reduction is not improved.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
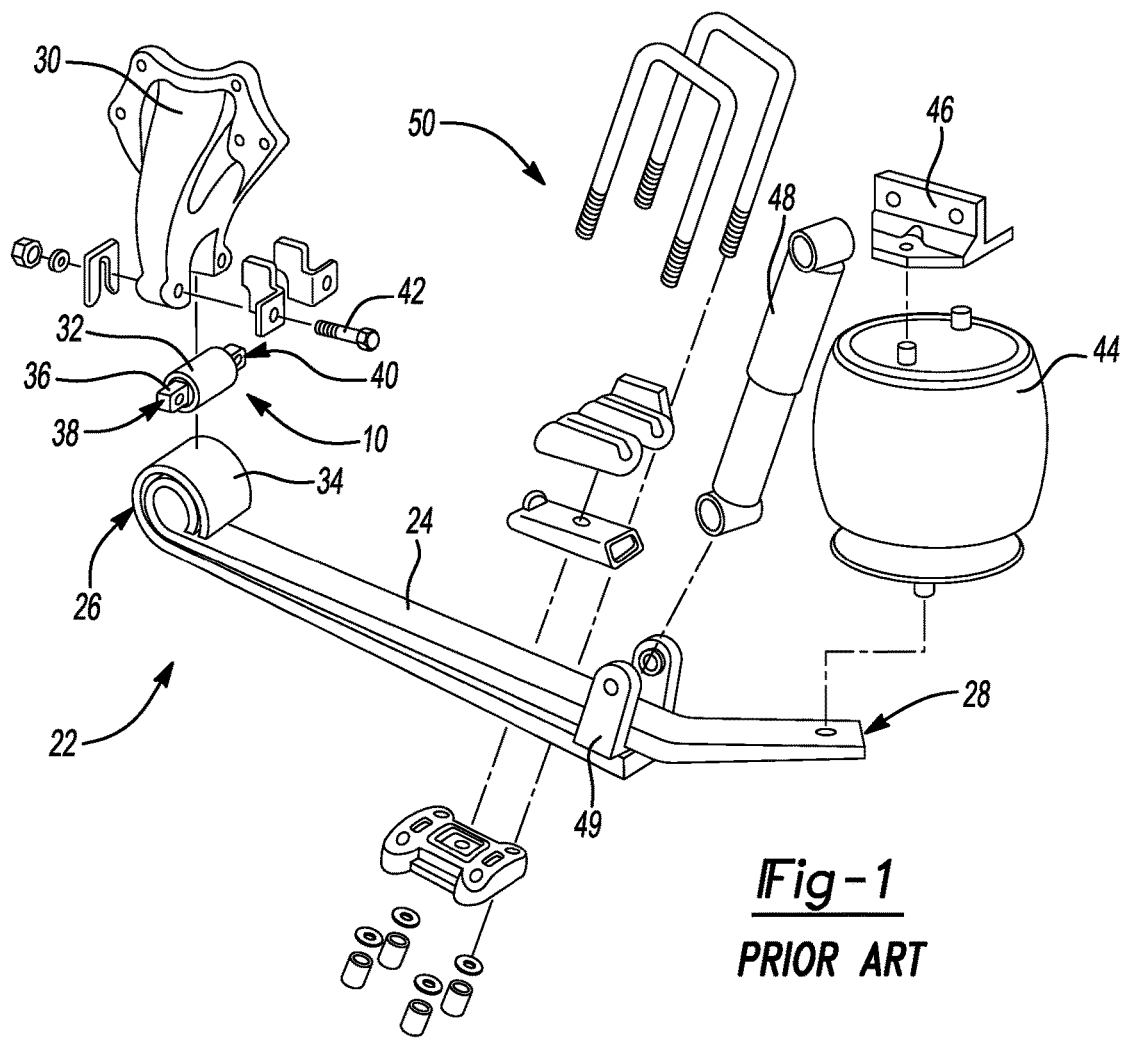
FIG. 1 is a side perspective exploded view of an exemplary vehicle suspension system, which includes a bushing assembly.
Figure 2:
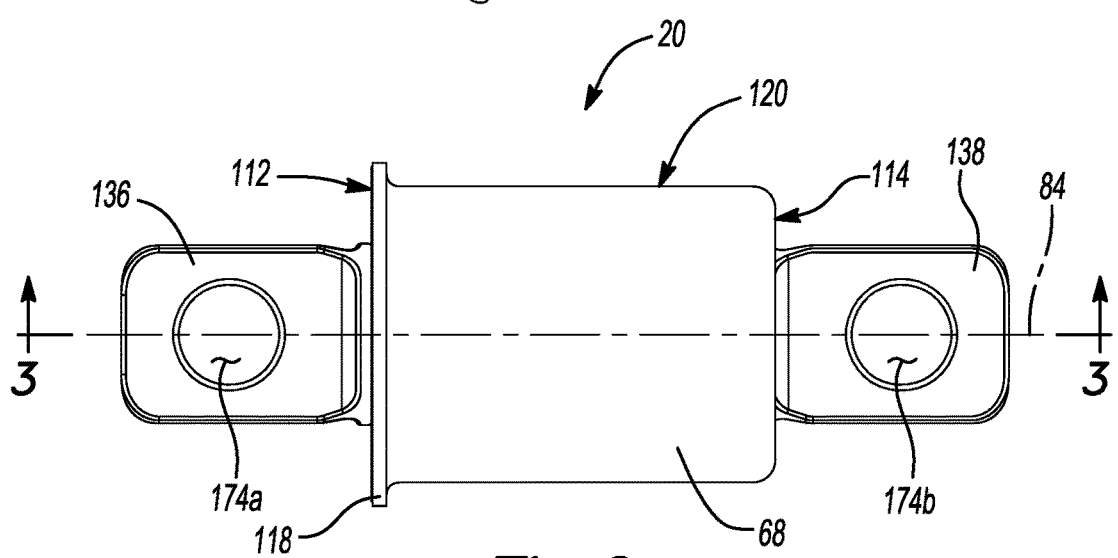
FIG. 2 is a side elevation view of an exemplary bushing assembly that is constructed in accordance with the subject disclosure.
Figure 3:
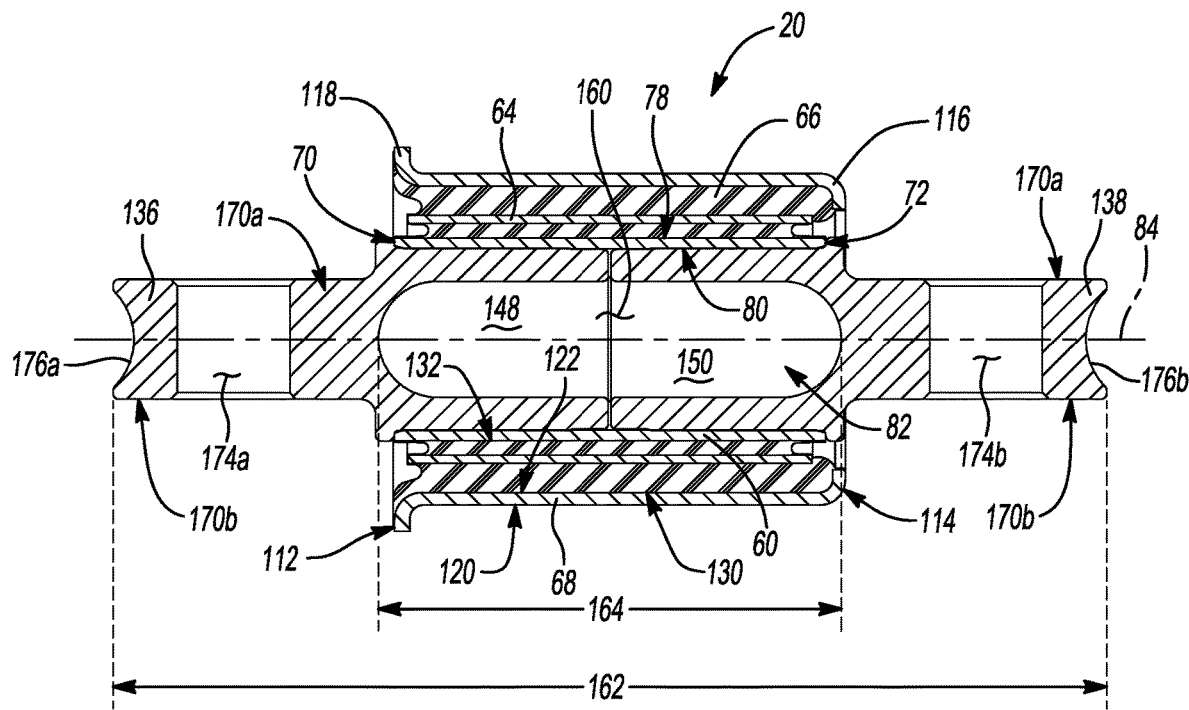
FIG. 3 is a side cross-sectional view of the exemplary bushing assembly illustrated in FIG. 2.
Figure 4:
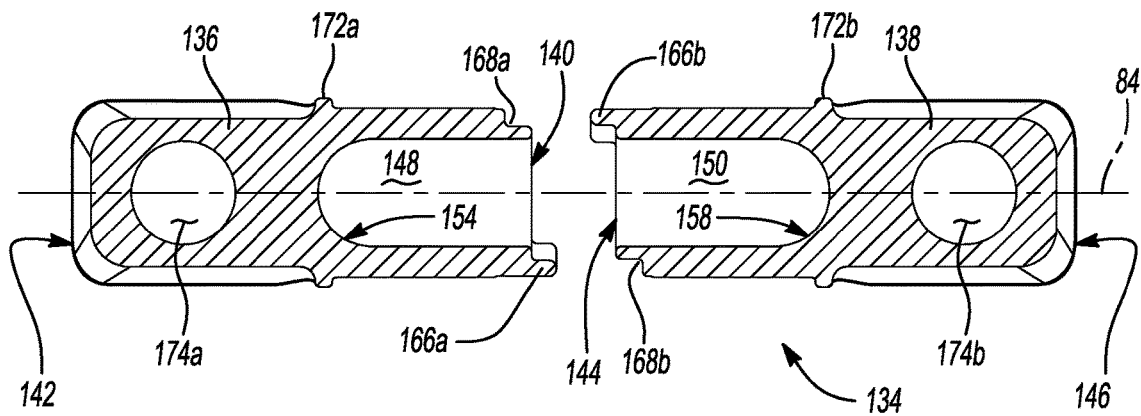
FIG. 4 is a side cross-sectional view of an exemplary two-piece bar pin of the bushing assembly illustrated in FIG. 3.
Figure 5:
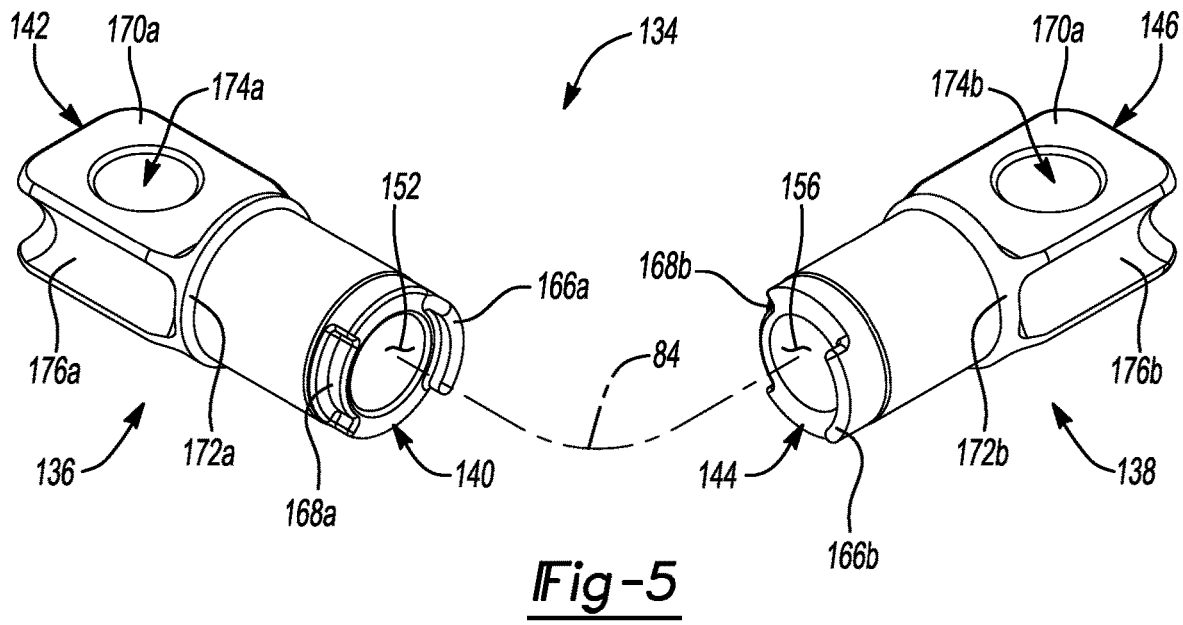
FIG. 5 is a side perspective view of the exemplary two-piece bar pin illustrated in FIG. 4.
Figure 6:
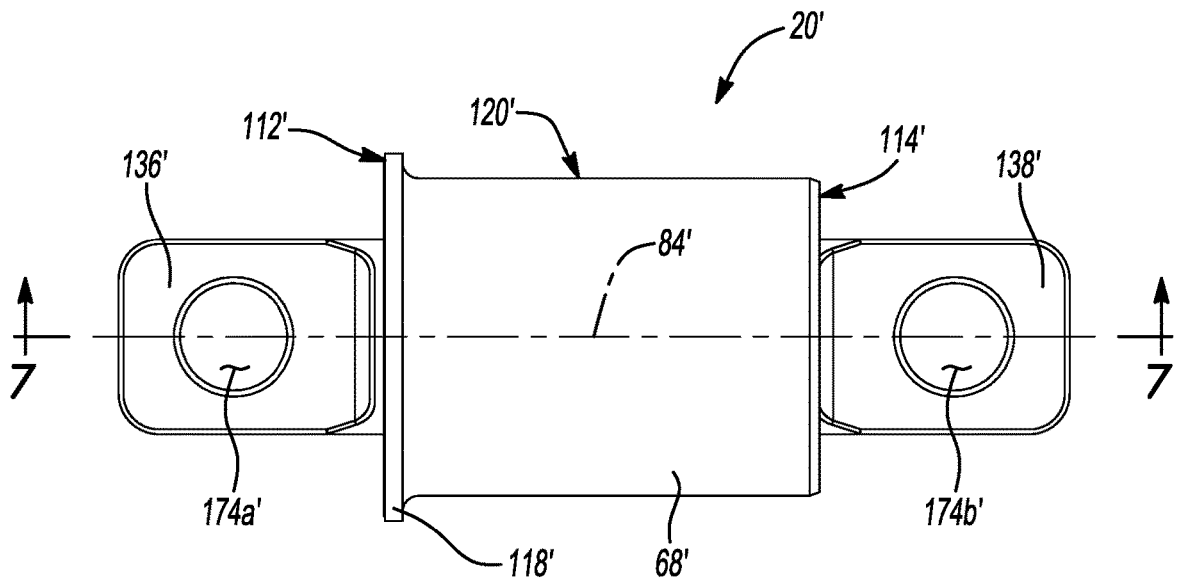
FIG. 6 is a side elevation view of another exemplary bushing assembly that is constructed in accordance with the subject disclosure.
Figure 7:
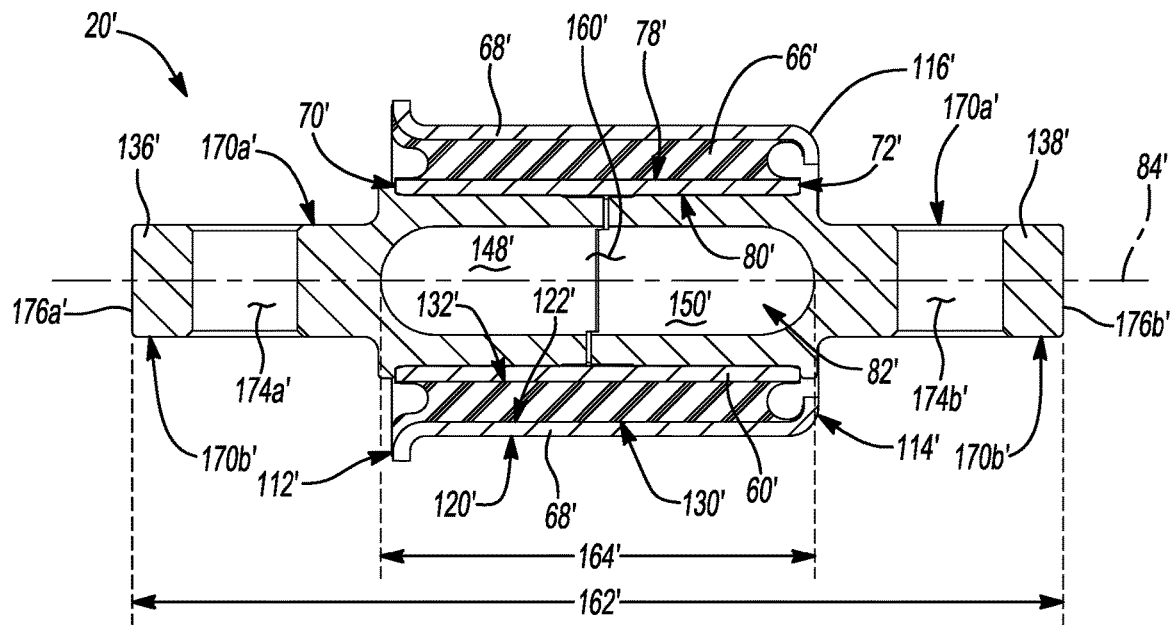
FIG. 7 is a side cross-sectional view of the exemplary bushing assembly illustrated in FIG. 6.
Figure 8:
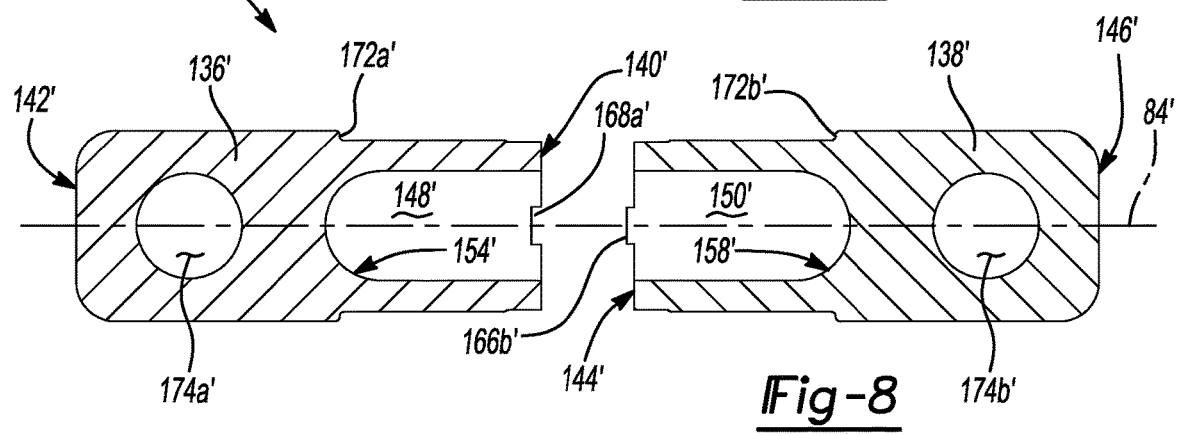
FIG. 8 is a side cross-sectional view of another exemplary two-piece bar pin of the bushing assembly illustrated in FIG. 7.
Figure 9:
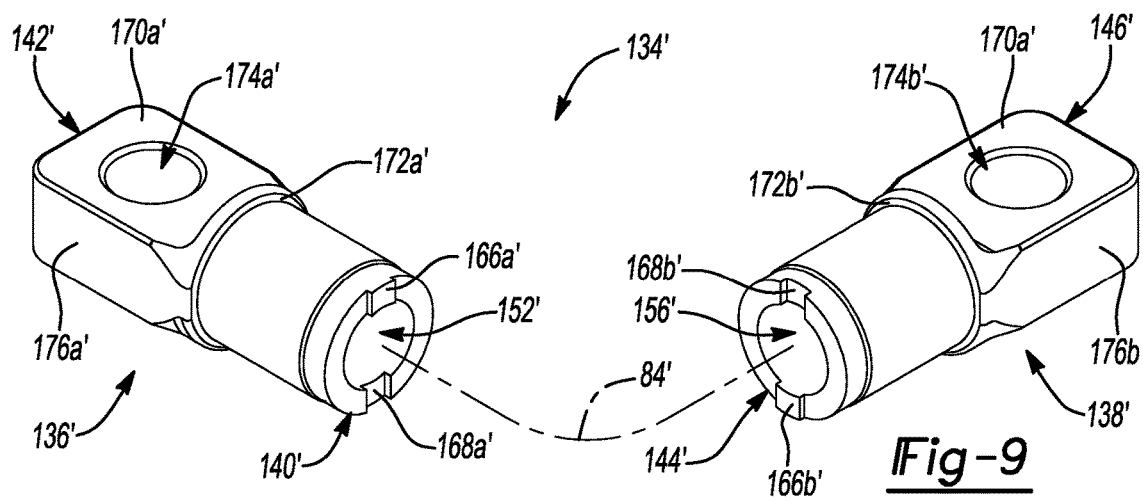
FIG. 9 is a side perspective view of the exemplary two-piece bar pin illustrated in FIG. 8.

Referring to the Figures, wherein like numerals indicate corresponding parts throughout the several views, various bushing assemblies 10, 20, 20' are illustrated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Bushing assemblies are generally used in a wide range of different applications. Thus, it should be appreciated that the scope of the subject disclosure is not necessarily limited to any particular application or applications. Notwithstanding the wide range of potential applications in which the subject disclosure might find utility, the bushing assemblies shown in the illustrated examples are designed for use in vehicles, such as heavy trucks, semi-tractors, buses, and the like. Heavy vehicles of this type are commonly designed with suspension systems that are connected by bushing assemblies 10 to a chassis of the vehicle. One common type of suspension system used in heavy truck/vehicle applications uses leaf springs that are mounted to the chassis (e.g., frame) of the vehicle. Such vehicles typically have solid axles that support and drive wheel assemblies mounted on opposing ends of each solid axle.

A typical heavy truck/vehicle suspension system 22 is illustrated in FIG. 1. The vehicle suspension system 22 comprises a leaf spring 24 that extends generally fore and aft before a front leaf spring end 26 and a rear leaf spring end 28. The front leaf spring end 26 is pivotally connected to a frame bracket 30 by bushing assembly 10. The frame bracket 30 is fixedly connected to the frame (not shown) or other support structure of the vehicle, which forms the vehicle chassis. In traditional designs, the bushing assembly 10 includes an outer metal sleeve 32 that is pressed into a loop 34 in the front leaf spring end 26 and a one-piece bar pin 36 that extends through the outer metal sleeve 32. An elastomeric material is positioned inside the outer metal sleeve 32 of the bushing assembly 10. The elastic material extends annularly about the one-piece bar pin 36 and the resiliency of the elastic material allows the one-piece bar pin 36 to move to a limited extent/degree within and relative to the outer metal sleeve 32. The one-piece bar pin 36 has opposing ends 38, 40 that are provided with holes for receiving fasteners 42, such as bolts, that fixably attach the one-piece bar pin 36 to the frame bracket 30.

The rear leaf spring end 28 may be connected to an air spring 44 that mounts to the frame via another bracket 46. The vehicle suspension system 22 further includes a shock absorber 48 that mounts to the vehicle chassis at one end and a yoke 49 provided on the leaf spring 24 at an opposite end. The vehicle axle (not shown) is mounted to the leaf spring 24 by a shackle assembly 50 and is configured to support a pair of wheel assemblies (not shown) on opposite ends of the axle. The air spring 44 supports the load for the sprung mass of the vehicle and the shock absorber 48 dampens the movement of the vehicle axle and wheel assemblies relative to the frame. The bushing assembly 10 allows the front leaf spring end 26 to move relative to the frame bracket 30 to a limited (i.e., small) extent/degree, which reduces the noise, vibration, and harshness (NVH) transferred from the leaf spring 24 to the frame bracket 30 or in other words from the vehicle axle to the frame, which helps to isolate the sprung mass of the vehicle from shock and vibration.

However, one problem with current one-piece bar pins 36, particularly in truck and off highway applications, is that they are heavy, expensive, and there is no economical way to remove the unnecessary excess material at the center of the bar pin 36 using conventional manufacturing processes. Typical one-piece bar pins 36 are machined as a single piece or are forged as a single piece. With machining, for example, it is typical to start with a solid bar that has a starting diameter that is greater than or equal to the largest diameter of the finished bar pin 36 and a starting length that is slightly greater than or equal to the finished bar pin 36. A machining process is then used to machine away the unneeded material to form features such as flats, holes, flanges or other profile features of the bar pin 36, resulting in a lot of excess scrap material (e.g., machining chips) being generated and lost to waste. All this excess material must be accounted for in the price of the finished part. In addition, there is no economical method to remove excess material from the center of a one-piece bar pin 36 since it is inaccessible to typical machining and boring operations, so the excess material is a penalty to both part weight as well as part cost.

While the vehicle suspension system 22 illustrated in FIG. 1 has only one bushing assembly 10 positioned at the connection between the front leaf spring end 26 and the frame bracket 30, this configuration could be reversed where the bushing assembly 10 is alternatively attached to the rear leaf spring end 28. It should also be appreciated that it is within the scope of the present disclosure to utilize any number of the bushing assemblies disclosed herein between any two components that require one of the components to pivot with respect to the other component. In addition, while the vehicle suspension system 22 illustrated in FIG. 1 has a leaf-spring configuration, it is within the scope of the present disclosure to utilize the bushing assemblies described herein in other types of vehicle suspension systems, including, without limitation, in independent suspension systems.

FIGS. 2-5 illustrate a bushing assembly 20 that has been constructed in accordance with the subject disclosure, which includes a two-piece bar pin assembly 134. The bushing assembly 20 in the illustrated example includes an inner sleeve 60, an intermediate sleeve/rate plate 64, a bushing 66, and an outer sleeve 68. The inner sleeve 60 extends longitudinally between a first inner sleeve end 70 and a second inner sleeve end 72. The inner sleeve 60 also has an inner sleeve outside surface 78 and an inner sleeve inside surface 80, opposite the inner sleeve outside surface 78, that defines a longitudinal bore 82. The longitudinal bore 82 extends co-axially within the inner sleeve 60 along a longitudinal axis 84. It should be understood that the terms "longitudinal" and "longitudinally" used in this disclosure describe elements that are generally arranged or directed in a direction that is parallel to the longitudinal axis 84. It should also be appreciated that the inner sleeve 60 may have a variety of different shapes and configurations and may be made from a variety of different materials, all of which are considered to be within the scope of the subject disclosure. By way of example and without limitation, the inner sleeve 60 may have a cylindrical shape and may be made of metal.

The outer sleeve 68 of the bushing assembly 20 extends longitudinally between a first outer sleeve end 112 and a second outer sleeve end 114. Optionally, the second outer sleeve end 114 may have an inwardly directed flange 116 that extends radially inward over at least part of the bushing 66 and towards the longitudinal axis 84, while the first outer sleeve end 112 may have an outwardly directed flange 118 that extends radially outward away from the longitudinal axis 84. The outer sleeve 68 has an outer sleeve outside surface 120 and an outer sleeve inside surface 122 opposite the outer sleeve outside surface 120. The outer sleeve 68 and the inner sleeve 60 are concentrically arranged about the longitudinal axis 84 such that the outer sleeve 68 extends annularly about the inner sleeve 60 in a radially spaced relationship. Accordingly, the outer sleeve inside surface 122 faces the inner sleeve outside surface 78 and is radially spaced from the inner sleeve outside surface 78. It should be appreciated that the outer sleeve 68 may have a variety of different shapes and configurations and may be made from a variety of different materials, all of which are considered to be within the scope of the subject disclosure. By way of example and without limitation, the outer sleeve 68 may have a cylindrical shape and may be made of metal.

The bushing 66 extends annularly between the inner and outer sleeves 60, 68 and is disposed radially between the outer sleeve 68 and the inner sleeve 60 such that at least a portion of the outside bushing surface 130 abuts the outer sleeve inside surface 122 and at least a portion of the inside bushing surface 132 abuts the inner sleeve outside surface 78. Preferably, the bushing 66 is molded or overmolded between the outer sleeve 68 and the inner sleeve 60, however, other manufacturing processes may be used to form the bushing 66. In operation, the bushing 66 mechanically decouples the inner sleeve 60 from the outer sleeve 68. It should be appreciated that the bushing 66 may have a variety of different shapes and configurations and may be made from a variety of different materials, all of which are considered to be within the scope of the subject disclosure. Notwithstanding, the bushing 66 must be made in a configuration and a material that is resilient and capable of deflecting and dampening vibrations. By way of example and without limitation, the bushing 66 may be made of an elastomeric material such as natural rubber.

The rate plate 64 shown in the illustrated example is embedded in the resilient material of the bushing 66 to increase its effective stiffness and damping rate and is an optional component of the bushing assembly 20. When present, the rate plate 64 extends annularly about the inner sleeve 60 in a concentric arrangement such that the rate plate 64 is spaced radially outward of the inner sleeve 60. However, it should be appreciated that the rate plate 64 may have a variety of different shapes and configurations and may be made from a variety of different materials, all of which are considered to be within the scope of the subject disclosure. By way of example and without limitation, the rate plate 64 may have a cylindrical shape and may be made of metal. As noted above and shown in the second embodiment, it should also be appreciated that for at least some applications, the rate plate 64 may be eliminated entirely.

In accordance with the present disclosure, the bushing assembly 20 includes a two-piece bar pin assembly 134. The two-piece bar pin assembly 134 is comprised of a first bar pin component 136 and a second bar pin component 138. The first bar pin component 136 extends longitudinally between a first inboard end 140 and a first outboard end 142. Similarly, the second bar pin component 138 extends longitudinally between a second inboard end 144 and a second outboard end 146. The bushing assembly 20 is assembled such that the first and second inboard ends 140, 144 of the first and second bar pin components 136, 138 are received in the longitudinal bore 82 of the inner sleeve 60 in a press fit and are arranged such that the first and second inboard ends 140, 144 of the first and second bar pin components 136, 138 abut one another.

The first inboard end 140 of the first bar pin component 136 includes a first closed end bore 148 and the second inboard end 144 of the second bar pin component 138 includes a second closed end bore 150. It should be appreciated by this description and terminology that the first closed end bore 148 extends longitudinally within the first bar pin component 136 and includes an open end 152 at the first inboard end 140 of the first bar pin component 136 and a closed end 154 that is located inside the first bar pin component 136. Similarly, it should be appreciated that the second closed end bore 150 extends longitudinally within the second bar pin component 138 and includes an open end 156 at the second inboard end 144 of the second bar pin component 138 and a closed end 158 that is located inside the second bar pin component 136. Further, because the first and second inboard ends 140, 144 of the first and second bar pin components 136, 138 are disposed inside the inner sleeve 60 in an abutting arrangement, the first closed end bore 148 and the second closed end bore 150 cooperate to form a closed cavity 160 within the two-piece bar pin assembly 134.

The two-piece bar pin assembly 134 has an overall length 162 that is measured parallel to the longitudinal axis 84, while the closed cavity 160 that is formed by the first and second closed end bores 148, 150 has a longitudinal extent 164 that is measured parallel to the longitudinal axis 84 between the two opposing closed ends 154, 158 of the closed cavity 160. As such, the longitudinal extent 164 of the closed cavity 160 is less than the overall length 162 of the two-piece bar pin assembly 134. Thus, it should be appreciated that the closed cavity 160 extends longitudinally within the two-piece bar pin assembly 134, but does not extend completely through the first and second bar pin components 136, 138. It should also be appreciated that alternative arrangements are possible where only one of the first and second bar pin components 136, 138 has a closed end bore forming the closed cavity 160. While the first and second bar pin components 136, 138 in the illustrated examples are mirror images of one another, extend across approximately half of the overall length 162 of the two-piece bar pin assembly 134, and are interchangeable, it should be appreciated that other configurations are possible where one of the first and second bar pin components 136, 138 is longer than the other.

The first and second bar pin components 136, 138 may optionally include one or more clocking, interlocking, and/or alignment features to facilitate the proper assembly of the bushing assembly 20. In the illustrated example, the first inboard end 140 of the first bar pin component 136 includes a first projection 166a that is aligned with and received in a first opposing recess 168a in the second inboard end 144 of the second bar pin component 138. The second inboard end 144 of the second bar pin component 138 includes a second projection 166b that is aligned with and received in a second opposing recess 168b in the first inboard end 140 of the first bar pin component 136. The first projection 166a and the first opposing recess 168a are diametrically opposed (i.e., positioned 180 degrees apart) relative to the second projection 166b and the second opposing recess 168b and provide an interlocking arrangement between the first and second bar pin components 136, 138 that ensures proper alignment of the first and second bar pin components 136, 138 when they are pressed into the longitudinal bore 82 of the inner sleeve 60. The first projection 166a and the first opposing recess 168a and the second projection 166b and the second opposing recess 168b also prevent the first bar pin component 136 from rotating relative to the second bar pin component 138 within the longitudinal bore 82 of the inner sleeve 60.

Although other geometries are possible, in the illustrated examples, the first and second outboard ends 142, 146 of the first and second bar pin components 136, 138 have a rectangular shape with a pair of flattened surfaces 170a, 170b. Meanwhile, each of the first and second inboard ends 140, 144 of the first and second bar pin components 136, 138 has a cylindrical shape that extends to a radially projecting flange 172a, 172b. The radially projecting flange 172a on the first bar pin component 136 abuts the first inner sleeve end 70 and therefore acts as a stop when the first bar pin component 136 is pressed into the longitudinal bore 82 of the inner sleeve 60. Similarly, the radially projecting flange 172b on the second bar pin component 138 abuts the second inner sleeve end 72 and therefore acts as a stop when the second bar pin component 138 is pressed into the longitudinal bore 82 of the inner sleeve 60.

The first outboard end 142 of the first bar pin component 136 has a first through bore 174a that is transverse (i.e., arranged at a perpendicular or oblique angle) to the longitudinal axis 84 and the second outboard end 146 of the second bar pin component 138 has a second through bore 174b that is also transverse to the longitudinal axis 84. The first and second through bores 174a, 174b extend entirely through the first and second outboard ends 142, 146 of the first and second bar pin components 136, 138 from one flattened surface 170a to the other flattened surface 170b and are configured to receive the fasteners 42 shown in FIG. 1.

Optionally, the first and second outboard ends 142, 146 of the first and second bar pin components 136, 138 have peripheral surfaces 176a, 176b that are concave (i.e., have a concave chamfer). Preferably, the first and second bar pin components 136, 138 are made of metal and have compacted areas of greater density formed by a cold forming/cold working process (e.g., a cold heading process).

FIGS. 6-9 illustrate another embodiment of an exemplary bushing assembly 20', which is a simplified version of the bushing assembly 20 illustrated in FIGS. 2-5. Thus, the elements of the bushing assembly 20' shown in FIGS. 6-9 are the same or substantially the same as the bushing assembly 20 shown in FIGS. 2-5, except that the rate plate 64 has been eliminated in FIGS. 6-9. In addition, the geometries of the peripheral surfaces 176a, 176b, the first and second projections 166a, 166b, and the first and second opposing recesses 168a, 168b have been simplified in FIGS. 6-9 to reduce cost and improve manufacturability using a cold heading process. Because the elements of the bushing assembly 20' shown in FIGS. 6-9 are the same or substantially the same as the bushing assembly 20 shown in FIGS. 2-5, the corresponding elements in FIGS. 6-9 are identified with the same reference numbers used in FIGS. 2-5, but have a prime symbol (') appended after the reference number. Thus, it should be appreciated that the above description applies equally to the elements shown in FIGS. 6-9 and will not be repeated unnecessarily.

It should be appreciated that FIGS. 2-5 and FIGS. 6-9 illustrate bushing assemblies 20, 20' in a pre-installed and fully assembled state. To install either bushing assembly 20, 20', the outer sleeve 68, 68' is pressed into the loop 34 at the front leaf spring end 26 of one of the leaf springs 24 shown in FIG. 1. Fasteners 42 are then inserted into the first and second through bores 174a, 174b, 174a', 174b' in the first and second outboard ends 142, 146, 142', 146' of the first and second bar pin components 136, 138, 136', 138' and are threaded into the frame bracket 30 or are secured by nuts to fixably couple the first and second bar pin components 136, 138, 136', 138' to the frame bracket 30.

A method of assembling the bushing assemblies 20, 20' discussed above will now be described. The method includes the step of arranging the outer sleeve 68, 68' concentrically/annularly about the inner sleeve 60, 60' such that the outer sleeve 68, 68' and the inner sleeve 60, 60' are radially spaced from one another and are co-axially aligned about the longitudinal axis 84, 84'. The method proceeds with the step of molding the bushing 66, 66' of elastomeric material between the outer sleeve 68, 68' and the inner sleeve 64, 64'. The method further includes the step of forming the two-piece bar pin 134, 134' by individually forming the first and second bar pin components 136, 138, 136', 138'. This step includes forming the first bar pin component 136, 136' with a first inboard end 140, 140' and a first outboard end 142, 142' and forming the second bar pin component 138, 138' with a second inboard end 144, 144' and a second outboard end 146, 146'. Preferably, the step of forming a two-piece bar pin 134 includes cold forming/cold working the first and second bar pin components 136, 138. For example, a cold heading process may be used to form the first and second bar pin components 136, 138, 136', 138'. This allows the features and geometry of the first and second bar pin components 136, 138, 136', 138' to be formed without the removal of material, like a machining process would, which generates scrap. Thus, the innovation of utilizing a two-piece bar pin 134, 134' instead of a one-piece bar pin 36 allows the bar pin to be made using a cold forming/cold working process instead of a machining process, which can reduce feedstock costs (i.e., the cost of materials) and enables the formation of one or more closed cavities 160, 160', concave chamfers 176a, 176b, or other weight saving features without the removal of feedstock material and without compromising strength. For example, the method may include the steps of forming a first closed end bore 148, 148' in the first inboard end 140, 140' of the first bar pin component 136, 136', forming a second closed end bore 150, 150' in the second inboard end 144, 144' of the second bar pin component 138, 138', and forming concave chamfers/peripheral surfaces 176a, 176b on the first and second outboard ends 142, 146 of the first and second bar pin components 136, 138. The method may also include forming attachment features such as forming a pair of flattened surfaces 170a, 170b, 170a', 170b' on the first and second outboard ends 142, 146, 142', 146' of the first and second bar pin components 136, 138, 136', 138'. All of these manufacturing/forming steps may be performed using a cold forming/working process, such as cold heading, or a hot forming/hot working process, such as hot forging, because the bar pin 134, 134' is a two-piece assembly.

Finally, the method may proceed with the step of drilling or machining first and second through bores 174a, 174b, 174a', 174b' in the first and second outboard ends 142, 146, 142', 146' of the first and second bar pin components 136, 138, 136', 138'.

The innovation of utilizing a two-piece bar pin 134, 134' also allows the cold forming of alignment features. For example, the method may include the steps of forming a first projection 166a, 166a' on the first inboard end 140, 140' of the first bar pin component 136, 136', forming a first opposing recess 168a, 168a' in the second inboard end 144, 144' of the second bar pin component 138, 138', forming a second projection 166b, 166b' on the second inboard end 144, 144' of the second bar pin component 138, 138', and/or forming a second opposing recess 168b, 168b' in the first inboard end 140, 140' of the first bar pin component 136, 136'.

After the first and second bar pin components 136, 138, 136', 138' are formed, the method continues with the step of pressing the first inboard end 140, 140' of the first bar pin component 136, 136' into the first inner sleeve end 70, 70' and pressing the second inboard end 144, 144' of the second bar pin component 138, 138' into the second inner sleeve end 72, 72' until the first and second inboard ends 140, 144, 140', 144' of the first and second bar pin components 136, 138, 136', 138' abut one another inside the longitudinal bore 82, 82' of the inner sleeve 60, 60'. The method may further include the step of arranging the first and second inboard ends 140, 144, 140', 144' of the first and second bar pin components 136, 138, 136', 138' inside the longitudinal bore 82, 82' of the inner sleeve 60, 60' such that the first closed end bore 148, 148' and the second closed end bore 150, 150' cooperate to form a closed cavity 160, 160' within the two-piece bar pin 134, 134'. In embodiments where the first and second bar pin components 136, 138, 136', 138' include alignment features, the method may further include the steps of aligning the one or more projections 166a, 166b, 166a', 166b' on the first and second inboard ends 140, 144, 140', 144' of the first and second bar pin components 136, 138, 136', 138' with one or more opposing recesses 168a, 168b, 168a', 168b' in the first and second inboard ends 140, 144, 140', 144' of the first and second bar pin components 136, 138, 136', 138' and pressing the first inboard end 140, 140' of the first bar pin component 136, 136' and the second inboard end 144, 144' of the second bar pin component 138, 138' into the longitudinal bore 82, 82' of the inner sleeve 60,

60' until the first projection 166a, 166a' on the first inboard end 140, 140' of the first bar pin component 136, 136' is received in the first opposing recess 168a, 168a' in the second inboard end 144, 144' of the second bar pin component 138, 138' and the second projection 166b, 166b' on the second inboard end 144, 144' of the second bar pin component 138, 138' is received in the second opposing recess 168b, 168b' in the first inboard end 140, 140' of the first bar pin component 136, 136' to interlock the first bar pin component 136, 136' with the second bar pin component 138, 138'.

The method further includes the steps of installing the bushing assembly 20, 20' in a vehicle suspension system 22. This method includes the step of pressing the outer sleeve 68, 68' into the loop 34 at the front leaf spring end 26 of one of the leaf springs 24 shown in FIG. 1. The method proceeds with the step of inserting fasteners 42 into the first and second through bores 174a, 174b, 174a', 174b' in the first and second outboard ends 142, 146, 142', 146' of the first and second bar pin components 136, 138, 136', 138' and the frame bracket 30 to fixably couple the first and second bar pin components 136, 138, 136', 138' to the frame bracket 30. In accordance with this step, the fasteners 42 may be threaded directly into the frame bracket 30, or alternatively, this step of the method may include threading nuts onto the shaft of the fasteners 42 and tightening the nuts to fixably couple the first and second bar pin components 136, 138, 136', 138' to the frame bracket 30.

Advantageously, the two-piece bar pin assemblies 134, 134' described herein can be made by starting with a slug of material that has the same weight or almost the same weight as the finished part, with little to no scrap cost lost to machining. In addition, the design of the two-piece bar pin assemblies 134, 134' described herein provides access to the center of the bar pin 134, 134' so that it can be hollowed out, providing the ability to eliminate unnecessary material in the center of the bar pin 134, 134' that cannot be eliminated with conventional processes. The closed cavity 160, 160' in the center on the two-piece bar pin assemblies 134, 134' allows for the starting slug to be made with significantly less material allowing for the potential to significantly lower cost and weight. The design of the two-piece bar pin assemblies 134, 134' described herein also makes it easier/more economical to create a bar pin 134, 134' where the center of the bar pin 134, 134' is smaller in diameter than the outboard ends 142, 146, 142', 146'. With convention forming processes, it is very difficult, if not impossible to economically form the complex shapes of the bar pin 134, 134' using a single piece of feedstock because the plane that the forming dies move in does not allow for it. With conventional machining process, the machining of such shapes would result in significant cost increases due to the amount of scrap generated and therefore lost to the machining process.

Many modifications and variations of the present disclosure are possible in light of the above teachings and may be practiced otherwise than as specifically described while within the scope of the appended claims. These antecedent recitations should be interpreted to cover any combination in which the inventive novelty exercises its utility. With respect to the methods set forth herein, the order of the steps may depart from the order in which they appear without departing from the scope of the present disclosure and the appended method claims. Additionally, various steps of the method may be performed sequentially or simultaneously in time.

What is claimed is:

1. A bushing assembly, comprising:
   an inner sleeve extending longitudinally between a first inner sleeve end and a second inner sleeve end, the inner sleeve extending annularly about a longitudinal axis;
   an outer sleeve extending annularly about the inner sleeve in a radially spaced relationship;
   a bushing disposed radially between the inner and outer sleeves; and
   a two-piece bar pin assembly including a first bar pin component and a second bar pin component, the first bar pin component extending longitudinally between a first inboard end and a first outboard end, the second bar pin component extending longitudinally between a second inboard end and a second outboard end,
   wherein the first and second inboard ends of the first and second bar pin components are received in the inner sleeve in a press fit and abut one another.

2. The bushing assembly set forth in claim 1, wherein the first outboard end of the first bar pin component includes a first through bore that is transverse to the longitudinal axis and the second outboard end of the second bar pin component includes a second through bore that is transverse to the longitudinal axis.

3. The bushing assembly set forth in claim 2, wherein each of the first and second outboard ends of the first and second bar pin components has a pair of flattened surfaces and wherein the first and second through bores extend through the first and second bar pin components from one of the flattened surfaces to the other flattened surface.

4. The bushing assembly set forth in claim 3, wherein each of the first and second inboard ends of the first and second bar pin components has a cylindrical shape that extends to a radially projecting flange that abuts one of the first and second inner sleeve ends after the first and second inboard ends of the first and second bar pin components are pressed into the inner sleeve.

5. The bushing assembly set forth in claim 4, wherein the first and second bar pin components are made of metal and have compacted areas of greater density formed by cold heading or hot forging.

6. The bushing assembly set forth in claim 5, wherein the first and second outboard ends of the first and second bar pin components have peripheral surfaces that are concave.

7. The bushing assembly set forth in claim 1, wherein the first inboard end of the first bar pin component includes a first closed end bore and the second inboard end of the second bar pin component includes a second closed end bore such that the first closed end bore and the second closed end bore cooperate to form a closed cavity within the two-piece bar pin assembly.

8. The bushing assembly set forth in claim 1, wherein the first and second inboard ends of the first and second bar pin components include a least one projection that is aligned with and received in at least one opposing recess to provide an interlocking arrangement that ensures proper alignment of the first and second bar pin components and prevents the first bar pin component from rotating relative to the second bar pin component within the inner sleeve.

9. The bushing assembly set forth in claim 1, wherein the bushing is made of an elastomeric material and includes a rate plate that has a cylindrical shape and that extends annularly within the bushing between the inner and outer sleeves.

10. A bushing assembly, comprising:

an inner sleeve extending longitudinally between a first inner sleeve end and a second inner sleeve end, the inner sleeve extending annularly about a longitudinal axis;

an outer sleeve extending annularly about the inner sleeve in a radially spaced relationship;

a bushing disposed radially between the inner and outer sleeves; and a two-piece bar pin assembly including a first bar pin component and a second bar pin component, the first bar pin component extending longitudinally between a first inboard end and a first outboard end, the second bar pin component extending longitudinally between a second inboard end and a second outboard end, wherein the first and second inboard ends of the first and second bar pin components are received in the inner sleeve and at least one of the first and second inboard ends of the first and second bar pin components has a closed end bore such that the first and second bar pin components cooperate to form a closed cavity within the two-piece bar pin assembly, wherein the first inboard end of the first bar pin component includes a first closed end bore and the second inboard end of the second bar pin component includes a second closed end bore such that the first closed end bore and the second closed end bore cooperate to form the closed cavity within the two-piece bar pin assembly.

11. The bushing assembly set forth in claim 10, wherein the two-piece bar pin assembly has an overall length measured parallel to the longitudinal axis and the closed cavity has a longitudinal extent that is less than the overall length of the two-piece bar pin assembly such that the closed cavity does not extend completely through the first and second bar pin components.

12. The bushing assembly set forth in claim 10, wherein the first and second inboard ends of the first and second bar pin components are arranged in the inner sleeve in a press fit.

13. The bushing assembly set forth in claim 10, wherein each of the first and second outboard ends of the first and second bar pin components includes a through bore that is transverse to the longitudinal axis and configured to receive a fastener.

14. The bushing assembly set forth in claim 10, wherein the first inboard end of the first bar pin component includes at least one projection that is aligned with and received in at least one opposing recess in the second inboard end of the second bar pin component to provide an interlocking arrangement between the first and second bar pin components that ensures proper alignment of the first and second bar pin components and prevents the first bar pin component from rotating relative to the second bar pin component within the inner sleeve.

15. A method of assembling a bushing assembly, the method comprising the steps of:

forming an inner sleeve with first and second inner sleeve ends;

arranging an outer sleeve annularly about the inner sleeve such that the outer sleeve and the inner sleeve are radially spaced from one another and are concentrically aligned about a longitudinal axis;

positioning a bushing of elastomeric material between the outer sleeve and the inner sleeve;

forming a two-piece bar pin by individually forming first and second bar pin components, the first bar pin component having a first inboard end and a first outboard end and the second bar pin component having a second inboard end and a second outboard end; and pressing the first inboard end of the first bar pin component into the first inner sleeve end and pressing the second inboard end of the second bar pin component into the second inner sleeve end until the first and second inboard ends of the first and second bar pin components abut one another inside the inner sleeve.

16. The method set forth in claim 15, wherein the step of forming a two-piece bar pin includes cold forming the first and second bar pin components.

17. The method set forth in claim 15, wherein the step of forming a two-piece bar pin includes forming the first and second bar pin components by a cold heading process.

18. The method set forth in claim 15, further comprising the steps of:

forming a first closed end bore in the first inboard end of the first bar pin component;

forming a second closed end bore in the second inboard end of the second bar pin component; and arranging the first and second inboard ends of the first and second bar pin components inside the inner sleeve such that the first closed end bore and the second closed end bore cooperate to form a closed cavity within the two-piece bar pin.

19. The method set forth in claim 15, further comprising the steps of:

forming at least one projection on the first inboard end of the first bar pin component;

forming at least one opposing recess in the second inboard end of the second bar pin component;

aligning the at least one projection on the first inboard end of the first bar pin component with the at least one opposing recess in the second inboard end of the second bar pin component; and pressing the first inboard end of the first bar pin component and the second inboard end of the second bar pin component into the inner sleeve until the at least one projection on the first inboard end of the first bar pin component in received in the at least one opposing recess in the second inboard end of the second bar pin component to interlock the first bar pin component with the second bar pin component.

* * * * *